US008181171B2

(12) United States Patent
Ito et al.

(10) Patent No.: US 8,181,171 B2
(45) Date of Patent: May 15, 2012

(54) METHOD AND APPARATUS FOR ANALYZING LARGE SCALE PROGRAM AND GENERATION OF CODE FROM DEGENERATED PROGRAM DEPENDENCE GRAPH

(75) Inventors: Makiko Ito, Kawasaki (JP); Hideo Miyake, Kawasaki (JP); Atsuhiro Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 944 days.

(21) Appl. No.: 12/191,623

(22) Filed: Aug. 14, 2008

(65) Prior Publication Data

US 2009/0007087 A1 Jan. 1, 2009

Related U.S. Application Data

(63) Continuation of application No. PCT/JP2006/302955, filed on Feb. 20, 2006.

(51) Int. Cl.
*G06F 9/45* (2006.01)
*G06F 9/44* (2006.01)

(52) U.S. Cl. ............... 717/156; 717/144; 717/155

(58) Field of Classification Search .......... 717/151–158, 717/142–144
See application file for complete search history.

(56) References Cited

U.S. PATENT DOCUMENTS

| | | | | |
|---|---|---|---|---|
| 5,161,216 A * | 11/1992 | Reps et al. | ............... | 717/151 |
| 5,802,375 A * | 9/1998 | Ngo et al. | ............... | 717/160 |
| 5,894,576 A * | 4/1999 | Bharadwaj | ............... | 717/156 |
| 5,918,035 A * | 6/1999 | Van Praet et al. | ............... | 703/22 |
| 6,064,819 A * | 5/2000 | Franssen et al. | ............... | 717/156 |
| 6,077,313 A * | 6/2000 | Ruf | ............... | 717/155 |
| 6,327,699 B1 * | 12/2001 | Larus et al. | ............... | 717/128 |
| 6,374,403 B1 * | 4/2002 | Darte et al. | ............... | 717/161 |
| 6,578,197 B1 * | 6/2003 | Peercy et al. | ............... | 717/143 |
| 6,675,379 B1 * | 1/2004 | Kolodner et al. | ............... | 717/155 |
| 6,817,013 B2 | 11/2004 | Tabata et al. | | |
| 6,848,100 B1 * | 1/2005 | Wu et al. | ............... | 717/157 |
| 6,931,635 B2 * | 8/2005 | Inagaki et al. | ............... | 717/157 |

(Continued)

FOREIGN PATENT DOCUMENTS

JP 2002-116916 A 4/2002

OTHER PUBLICATIONS

Jeffrey, "A fully abstract semantics for concurrent graph reduction: extened abstract", IEEE, pp. 82-91, 1994.*

(Continued)

*Primary Examiner* — Anil Khatri
(74) *Attorney, Agent, or Firm* — Arent Fox LLP

(57) ABSTRACT

A dependent element group which is invertibly contractible is found by using program analysis information including a plurality of dependent elements representing dependent relationships of statement and control, the statement and the control being included in a program. Next, a program dependence graph in which dependent elements are made to be contracted is generated by contracting the found dependent element group. The number of vertices and the number of edges of the program dependence graph are reduced by the contraction of the dependent elements, so that a program dependence graph with a rough granularity can be generated. As a result, a calculation amount (calculation time) necessary for optimization processing such as parallel processing of the program can be reduced. That is, by generating the contracted program dependence graph having invertibility, it is possible to realize the analysis and optimization of large-scale software in a realistic time.

15 Claims, 12 Drawing Sheets

U.S. PATENT DOCUMENTS

| | | | | |
|---|---|---|---|---|
| 7,165,245 | B2* | 1/2007 | Robison | 717/145 |
| 7,430,670 | B1* | 9/2008 | Horning et al. | 713/190 |
| 7,478,378 | B2* | 1/2009 | Kundu et al. | 717/157 |
| 7,624,386 | B2* | 11/2009 | Robison | 717/144 |
| 7,627,864 | B2* | 12/2009 | Du et al. | 717/151 |
| 7,650,593 | B2* | 1/2010 | Horton et al. | 717/125 |
| 7,765,534 | B2* | 7/2010 | Archambault et al. | 717/154 |

OTHER PUBLICATIONS

Dou et al, "Mapping data flow graph to loop engine on array processor", IEEE, pp. 676-680, 2003.*

Martin et al, "Models of computations and system-evaluation of vertex probabilities in graph models of computations", Journal of the Assoc. of Computing Machinery, vil. 14, No. 2, pp. 281-299, 1967.*

Christiano et al, "Electrical flows, laplacian system and faster approximation of maximum flow in undirected graphs", ACM STOC, pp. 273-281, 2011.*

Reps, "Undecidability of context sensitive data dependence analsyis" ACM Trans. on Prog. Lang & Sys. vol. 22, No. 1, pp. 162-168, 2000.*

Jeanne Ferrante, et al, "The Program Dependence Graph and Its Use in Optimization", ACM Transaction on programming language and Systems, Jul. 1987, pp. 319-349, vol. 9, No. 3.

Susan Horwitz, et al., "Integrating Non-Interfering Versions of Programs", Conference Record of the Fifteenth ACM Symposium on Principles of Programming Languages, Jan. 13-15, 1988, ACM New York, NY.

Fumiaki Ohata et al, "Node Merging Method of Program Dependence Graph for Efficient Slice Computation", The transactions of the Institute of Electronics, Information and Communication Engineers (J84-D-I), Jul. 1, 2001, pp. 1021-1029, No. 7.

Fumiaki Ohata, et al., "Efficient Construction Method of Program Dependence Graph Using Dependency Locality", Mar. 19, 1999, Graduate School of Engineering Science, Osaka University, Osaka, Japan.

Susan Horwitz, et al., "On the Adequacy of Program Dependence Graphs for Representing Programs", Conference Record of the 15$^{th}$ Annual ACM Symposium on Principles of Programming Languages, pp. 1-12, 1988.

Thomas Ball, et al., "Constructing Control Flow From Control Dependence", R-92-1091, Computer Science Department; University of Wisconsin-Madison, Jun. 1992.

Hirotaka Ogawa et al., "A Design of OpenJIT Fronted System", Information Processing Society of Japan, Transactions on Programming, vol. 41, No. sig 2(PR06), p. 1-12, Mar. 2000.

* cited by examiner

METHOD AND APPARATUS FOR ANALYZING LARGE SCALE PROGRAM AND GENERATION OF CODE FROM DEGENERATED PROGRAM DEPENDENCE GRAPH

CROSS-REFERENCE TO RELATED APPLICATION

This application is a Continuation Application of International Application No. PCT/JP2006/302955, filed Feb. 20, 2006, designating the U.S., the entire contents of which are incorporated herein by reference.

BACKGROUND

1. Field

The present embodiments relate to an art for optimizing a large-scale program.

2. Description of the Related Art

Generally, throughput of a processor improves in accordance with an increase in operating frequency of the processor or improves by parallel execution of instructions. However, increasing the operating frequency results in increased power consumption of the processor. Further, to increase the operating frequency, the miniaturization of the structure of elements is required. The problem of power consumption and the problem of physical limitation due to the miniaturization of the elements make it difficult to realize further improvement in throughput of the processor.

It is known that the number of instructions that the processor can process in parallel is about two to four. Adopting a method such as speculative execution of the processing can realize a certain degree of improvement in parallelism, but it has been known that this method has a limit as well. Parallelizing a program into segments with a larger granularity than that of an instruction level and executing the resultant program by a plurality of processors improves execution efficiency of the program and lessens the above-mentioned problem of the throughput of the processor.

Furthermore, it is known a method in which parallelism latent in a program is extracted from a sequential program. In this method, among statements of the program, data- and control-dependent relationships are extracted, and a program dependence graph is generated based on the dependent relationships. The program dependence graph is a graph representing the meaning of the program using vertices, which represent the statements, and edges which represent the control-dependent relationships and the data-dependent relationships. The program dependence graph handles the control-dependent relationships and thus has a feature of enabling the optimization beyond the control flow. Further, the program dependence graph has a feature for facilitating the optimization since it represents the data-dependent relationships and the control-dependence relationships.

Furthermore, it is known that a program dependence graph can represent the meaning of a program.

Furthermore, it is known that if program dependence graphs of two programs are isomorphic, these programs are semantically equivalent.

Furthermore, it is known that an art to create a semantically equivalent control flow graph from a program dependence graph under a certain restriction condition.

The program dependence graph is a graph in which vertices represent statements or substitution expressions. For example, when several procedures or the like are targets, analysis based on the program dependence graph is possible since the number of vertices is about several tens. However, as for large-scale software, the number of vertices of a graph amounts to several thousands to several ten thousands if vertices represent statements or substitution expressions. It is generally known that a program optimization problem using a program dependence graph becomes an exponential function of the scale of the graph. Therefore, it is difficult to extract parallelism in the whole program with a realistic source and in a realistic time, based on a conventional program dependence graph in which a unit of the extraction is a statement.

Further, when the program dependence graph is made to be contracted, it is requisite that correct program codes can be generated from the contracted program dependence graph (invertibility). A program dependence graph whose invertibility is not ensured cannot be used in program optimization.

SUMMARY

According to one aspect of am embodiment, a program analyzing method including finding a dependent element group which is invertibly contractible by using program analysis information including a plurality of dependent elements representing dependent relationships of statement and control, the statement and the control being included in a program, and generating a program dependence graph in which dependent elements are made to be contracted by making the found dependent element group contract.

DETAILED DESCRIPTION OF THE EMBODIMENTS

Hereinafter, embodiments will be described, using the drawings.

Figure 1:
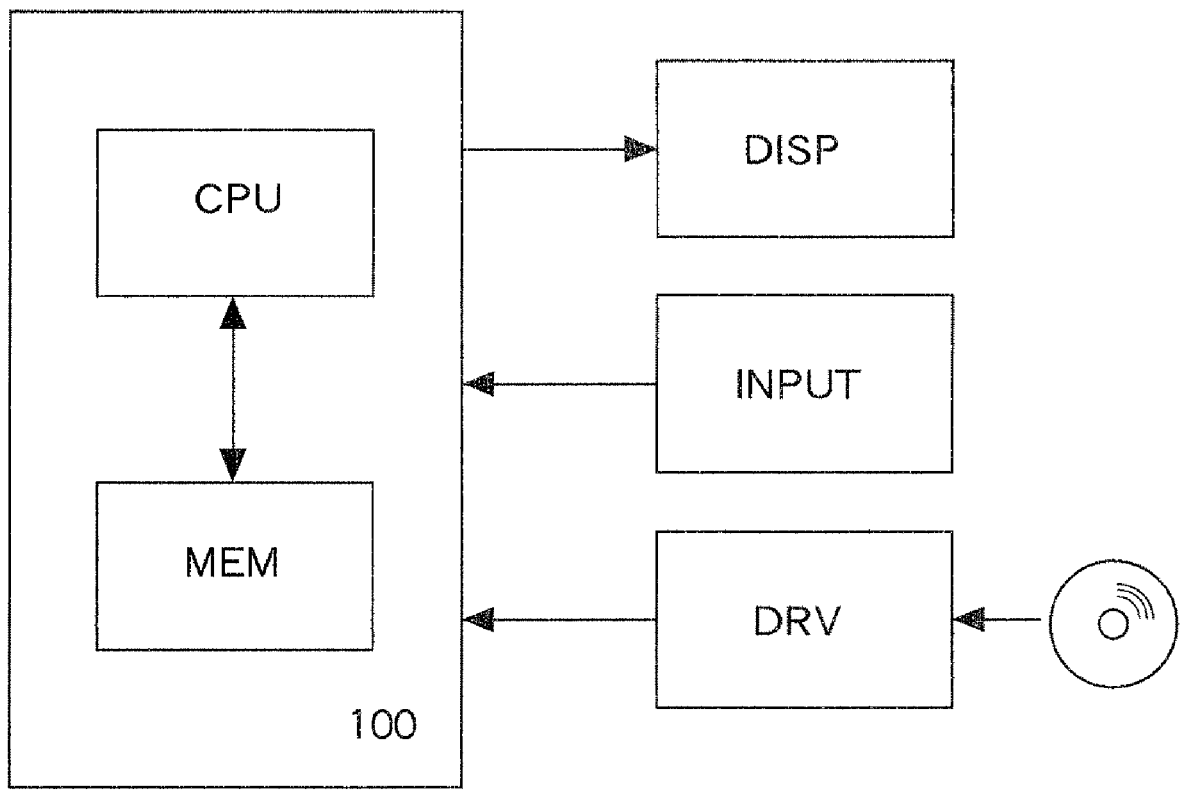
FIG. 1 illustrates a first embodiment.

FIG. 1 illustrates a first embodiment. A program analyzing apparatus 100 has a memory device MEM storing a program analyzing program and so on and a processor CPU executing the program analyzing program. The program analyzing apparatus 100 is, for example, a personal computer, a workstation, or the like. The memory device MEM is, for example, a hard disk drive. A display DISP, an input device INPUT such as a keyboard and a mouse, and a disk drive DRV are coupled to the program analyzing apparatus 100.

The display DISP displays information input from the input device INPUT and the disk drive DRV, execution results of the program analyzing program, and so on. In the disk drive DRV, storage medium such as CD-ROM and DVD in which the program analyzing program and a sequential program to be analyzed are set. The program analyzing program and the sequential program to be analyzed are downloaded to the memory device MEM via the disk drive DRV. Incidentally, instead of the disk drive DRV, a silicon disk such as a memory card or a hard disk drive storing the program analyzing program and so on may be coupled to the program analyzing apparatus 100. The program analyzing method of the present application is realized by the processor CPU executing the program analyzing program.

Figure 2:
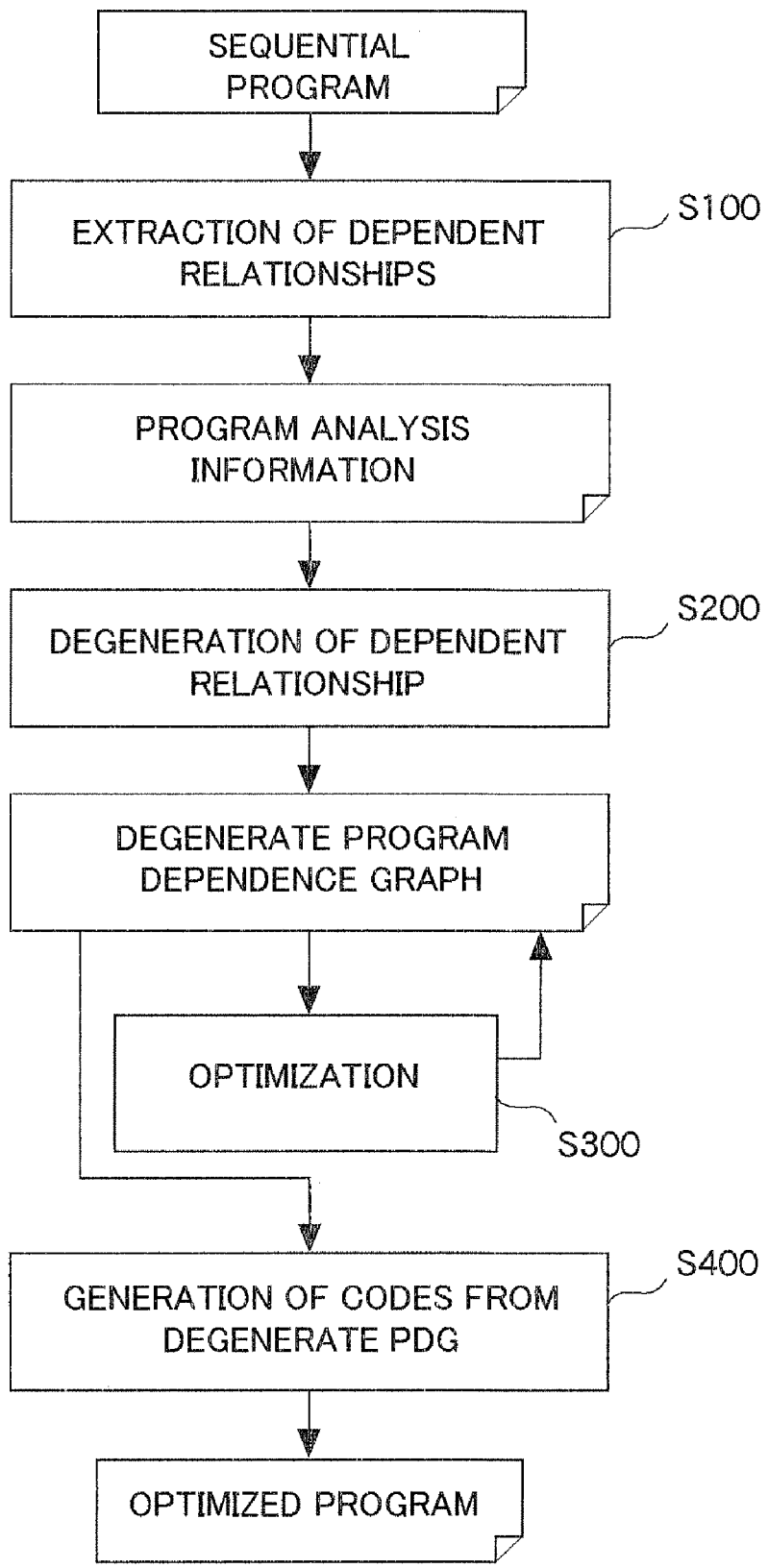
FIG. 2 illustrates an outline of a processing flow of an analyzing program executed by a program analyzing apparatus illustrated in FIG. 1.

FIG. 2 illustrates the outline of a processing flow of the program analyzing program executed by the program analyzing apparatus 100 (processor CPU) illustrated in FIG. 1.

First, at an operation S100, the sequential program read to the memory device MEM is analyzed and dependence relationships are extracted. Based on the dependence relationships, program analysis information such as a program dependence graph PDG is generated. The program analysis information is made up of a plurality of dependent elements representing dependent relationships of statement and control, the statement and the control being included in the program. The processing at the operation S100 is the same as conventional processing for generating a program dependence graph PDG.

Next, at an operation S200, in order to reduce the number of vertices and edges of the program dependence graph, the dependent elements (dependent relationship) of the program dependence graph PDG are made to be contracted, so that the vertices are merged. At this time, in order to generate correct program codes from the contracted program dependence graph, only dependent elements which are invertibly expandable are made to be contracted. Then, a contracted program dependence graph PDG with a rough granularity is created.

Thereafter, at an operation S300, the contracted program dependence graph PDG is optimized. In the optimization, for example, it is studied whether or not the vertices can be merged from a different point of view by transforming the shape of the graph. The optimization is executed for the purpose of reducing the number of codes. Alternatively, the optimization is executed for the purpose of improving processing speed by reducing the number of operations, that is, by improving parallelism. Then, until the optimization is satisfied, the operations S200, S300 are repeatedly executed, so that the degenerate program dependence graph PDG is generated. The degeneration reduces the scale of the graph to $1/10$-$1/100$ of the scale of the original graph.

Next, at an operation S400, program codes are generated from the contracted program dependence graph PDG. For example, a plurality of parallel-processable program codes are generated from the program dependence graph PDG. That is, the optimized program is generated. Since the scale of the graph is reduced as a result of the contraction, a calculation amount for extracting the parallelism of the program is far smaller than ever. As a result, the program can be optimized in a realistic time.

Figure 3:
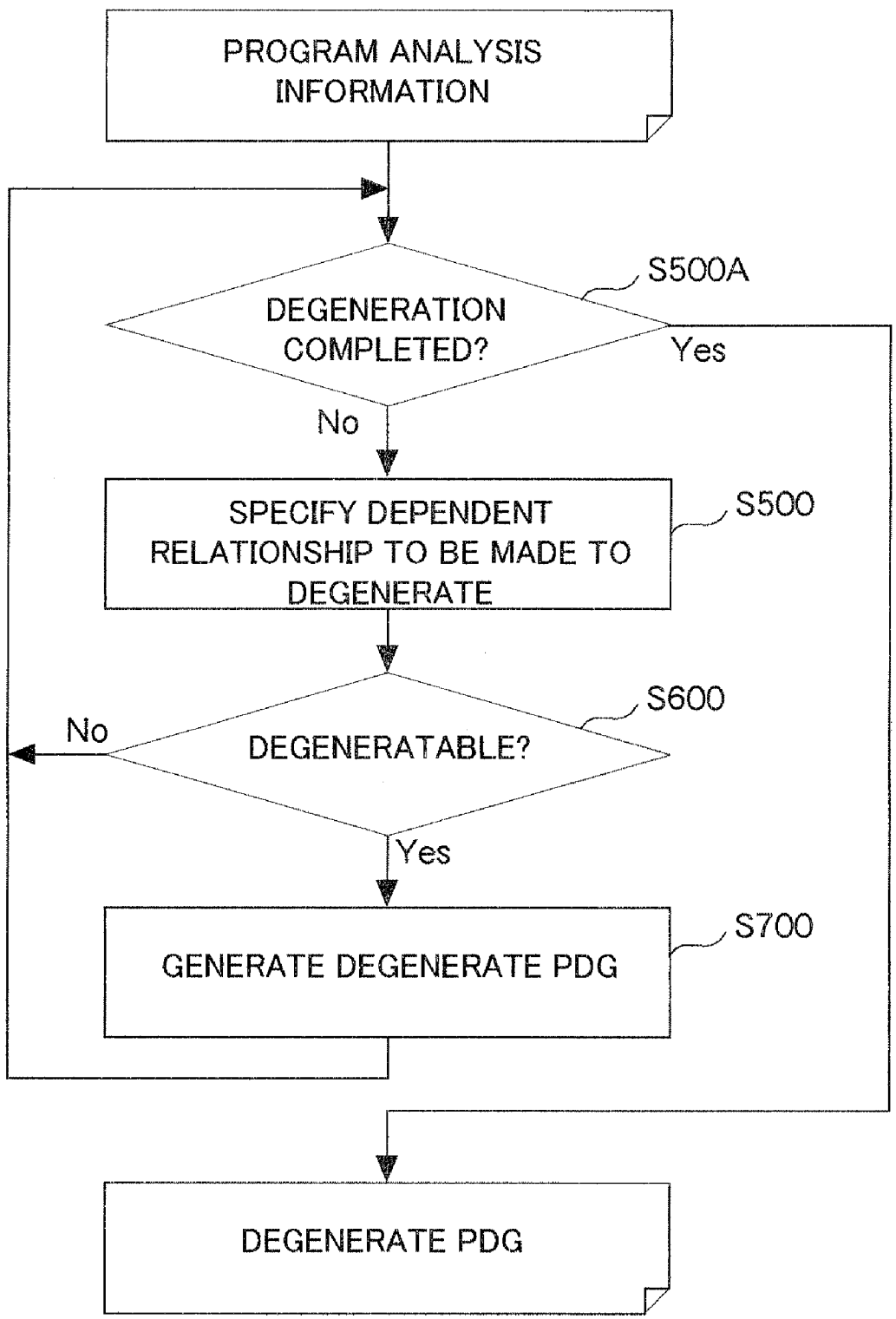
FIG. 3 illustrates details of an operation S200 illustrated in FIG. 2.

FIG. 3 illustrates details of the operation S200 illustrated in FIG. 2. First, at an operation S500A, it is judged whether or not the contraction has reached a sufficient level. If the contraction has not reached the sufficient level, the processing goes to an operation S500. If the contraction has reached the sufficient level, the processing ends and the contracted program dependence graph PDG is generated. Next, at the operation S500, dependent elements (dependent relationship) which are to be contracted are specified. Next, at an operation S600, it is judged whether or not the specified dependent elements are able to be contracted. The processor CPU executing the operations S500A, S500, S600 functions as a contraction judgment unit which finds a dependent relationship group which is invertibly expandable, by using program analysis information made up of a plurality of dependent elements representing dependent relationships of statement and control, the statement and the control being included in the program. Next, at an operation S700, only the dependent elements which are judged as contractible are made to be contracted, and the processing returns to the operation S500A. The processor CPU executing the operation S700 functions as a graph generation unit which generates a contracted program dependence graph PDG by making the dependent element group, which is judged as contractible, contracted.

In this embodiment, the program codes are generated by using the contracted program dependence graph PDG. Therefore, it is necessary to verify in advance that the correct program codes can be generated from the contracted program dependence graph PDG, that is, invertibility has to be verified. The operations S500, S600 are executed for this verification. That is, by the operations S500, S600, invertibility between the contracted program dependence graph PDG and the original program dependence graph PDG is ensured. In other words, by finding the dependent element group which is invertibly contractible, equivalence of the original sequential program and a sequential program generated from the degenerate program dependence graph PDG is ensured.

It has been known that, when the following two conditions (1), (2) are satisfied on a later-described control flow graph CFG, a control flow can be safely restructured from a program dependence graph of this program (invertibility is ensured).
(1) As for a back-edge e=(v, w) in the control flow graph, a vertex w dominates a vertex v.
(2) As for a natural loop in which the vertex v is an entry, any of the vertices w in the loop does not post-dominate the vertex v.

Therefore, if the following property is satisfied, the contraction of a dependent relationship of a vertex set Vx is allowed, and the resultant can be regarded as one vertex vx.
<Property>: Vertices belonging to the vertex set Vx which is a set of vertices on a program dependence graph PDG form a hammock H on a corresponding control flow graph CFG.

Thus, in this embodiment, in order to first enable the generation of proper program codes from the contracted program dependence graph PDG, an appropriate hammock is found in a subprogram not satisfying the above-mentioned condition (1) or condition (2) in the original program and is made to be contracted. Information on the control flow of the contracted subprogram is saved as additional information to be utilized when the program codes are generated. Further, when a plurality of vertices are made to contract into one vertex in order to reduce the scale of the program dependence graph PDG, the contraction is executed on condition that these vertices form a hammock H on the control flow graph CFG (condition allowing the contraction).

Here, the hammock H is a subgraph satisfying the following conditions (3)-(5) in a directed graph G
(3) The subgraph has an entry vertex and an exit vertex.
(4) Every directed path between a vertex v outside the hammock H and a vertex u within the hammock H passes through the entry vertex.
(5) Every directed path from the vertex u within the hammock H to the vertex w outside the hammock H passes through the exit vertex.

Figure 4:
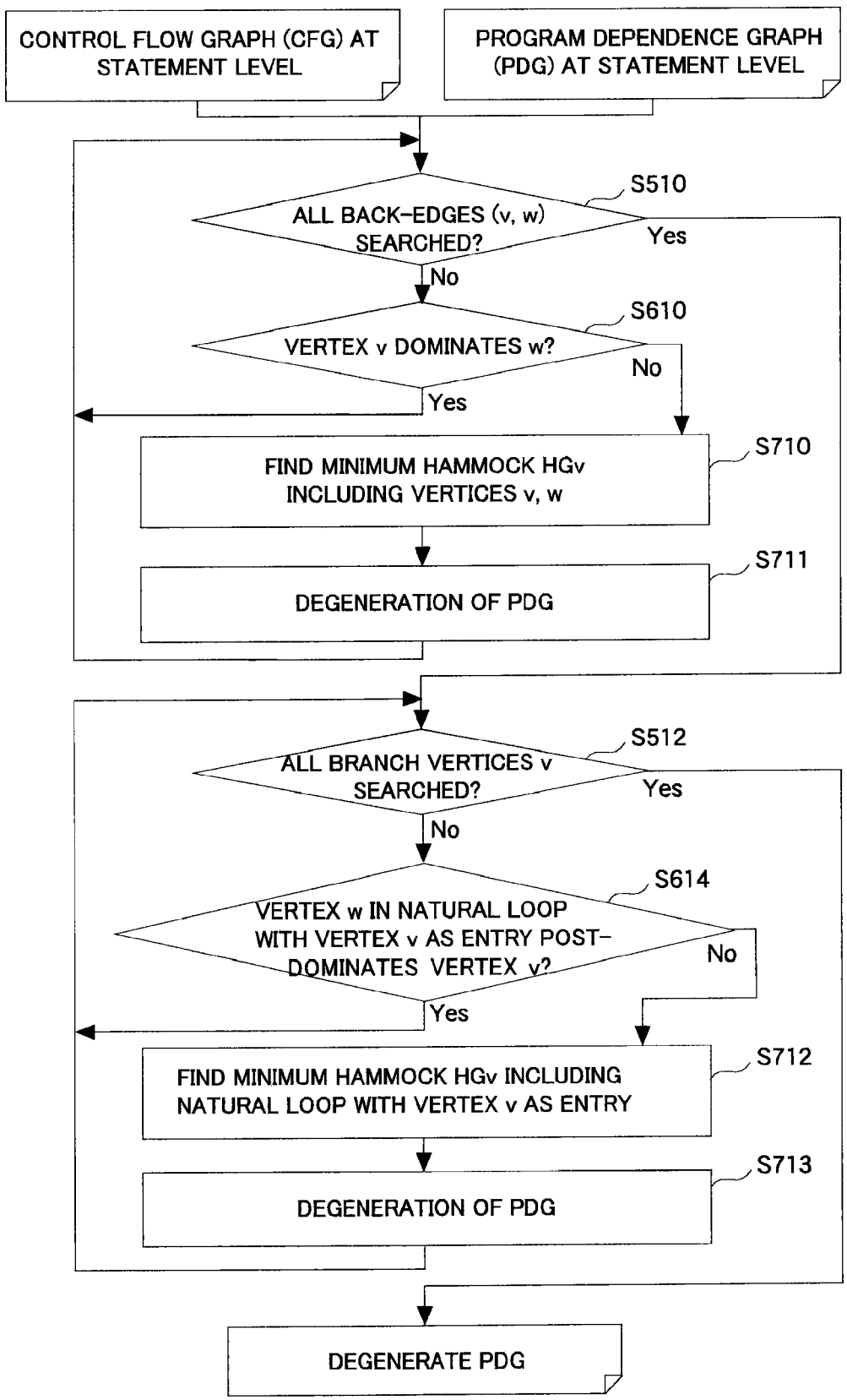
FIG. 4 illustrates details of the processing illustrated in FIG. 3.

FIG. 4 illustrates details of the processing illustrated in FIG. 3. In this example, a control flow graph CFG at the statement level and a program dependence graph PDG at the statement level are input as the program analysis information. Operations S510, S512 are processing corresponding to the operation S500A in FIG. 3. Operations S610, 5614, S710, S712 are processing corresponding to the operation S500 in FIG. 3. Since the search for a hammock is executed at the operation S710, it is obvious that the vertex set can be contracted. Therefore, the processing corresponding to the operation S600 in FIG. 3 is omitted. Operations S711, S713 are processing corresponding to the operation S700 in FIG. 3. At the operations S510, S610, S710, S711, the contraction processing corresponding to the above-mentioned condition (1) is executed. At the operations S512, S614, S712, S713, the contraction processing corresponding to the above-mentioned condition (2) is executed. The processor CPU executing the operations S510, S512, S610, S710, S711 functions as a contraction judgment unit. The processor CPU executing the operations S711, S713 functions as a graph generation unit.

First, at the operations S510, S610, it is judged whether or not the above-mentioned condition (1) is satisfied, regarding all back-edges (v, w) in the control flow graph CFG. If the condition (1) is satisfied, dependent elements (dependent relationships) invertibly expandable are specified and made to contract. Regarding a back-edge (v, w) not satisfying the condition (1), a minimum hammock HGv including the vertices v, w (subgraph) is found at the operation S710. Then, at the operation S711, in the control flow graph CFG and the program dependence graph PDG, a vertex set included in the hammock is made to contract into one vertex, and the processing returns to the operation S510.

Next, at the operations S512, S614, regarding all branch vertices v in the control flow graph CFG, it is judged whether or not the above-mentioned condition (2) is satisfied. If the condition (2) is satisfied, dependent elements (dependent relationships) which are invertibly expandable are specified and made to degenerate. As for a branch vertex v not satisfying the condition (2), a minimum hammock HGv including a natural loop with the vertex v as an entry is found at the operation S712. Then, at the operation S713, in the control flow graph CFG and the program dependence graph PDG, a vertex set included in the hammock is made to be contracted into one vertex, and the processing returns to the operation S512.

The scale of the contracted program dependence graph PDG can be reduced to ¹⁄₁₀-¹⁄₁₀₀ of the scale of the original program dependence graph PDG. For example, in compressing software of a typical moving image, the number of vertices is bout 6000 depending on the number of lines of a program. Reducing this number of vertices by two digits to about 60, a problem of a constant raised to the 6000th power can be changed to a problem of a constant raised to about the 100th power. That is, a problem whose solution is difficult to find in a realistic time can be changed to a problem which can be solved if some time is taken.

Figure 5:
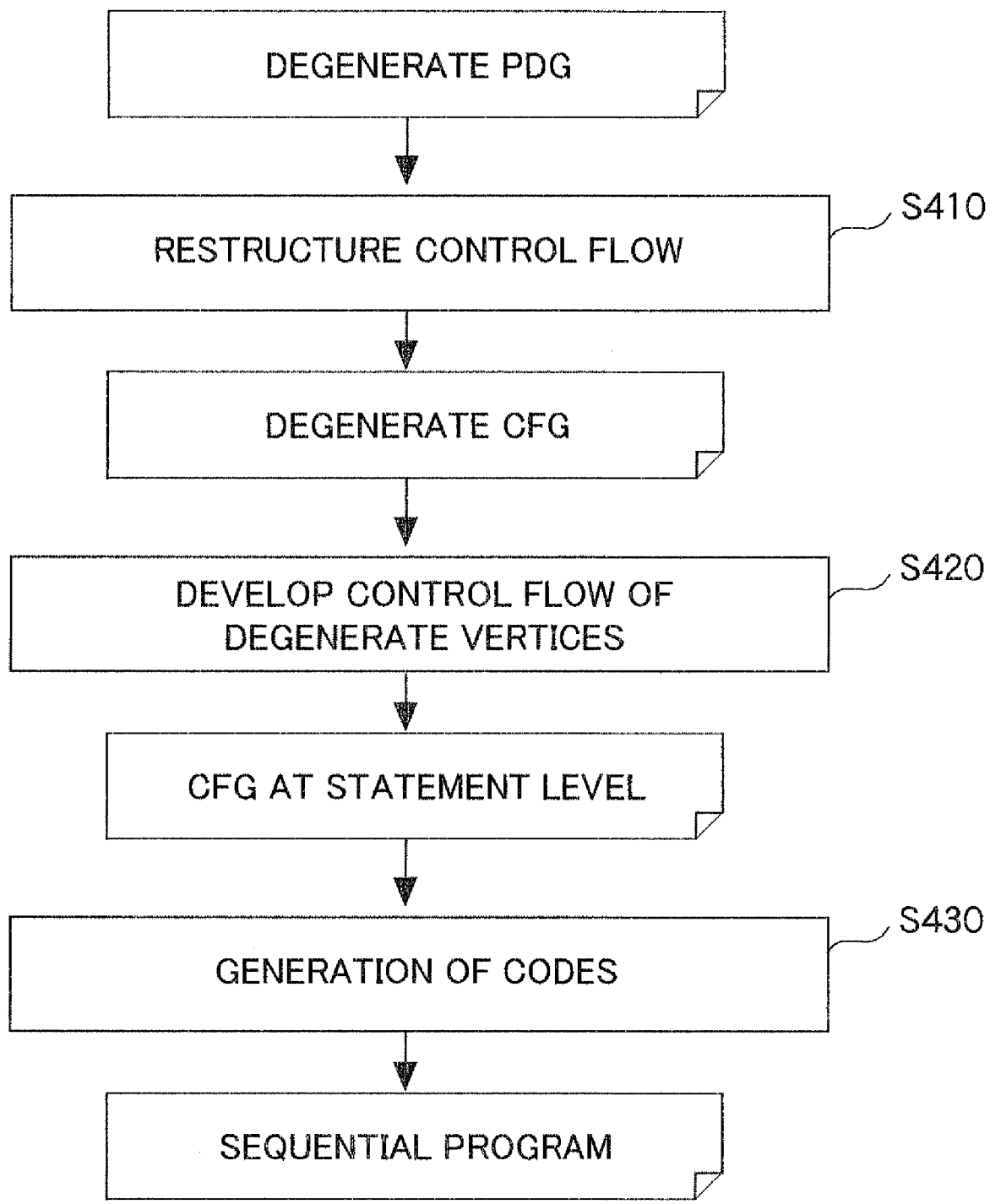
FIG. 5 illustrates details of an operation S400 illustrated in FIG. 2.

FIG. 5 illustrates details of the operation S400 illustrated in FIG. 2. First, at an operation S410, the control flow is restructured, so that a contracted control flow graph CFG is generated. At this time, since the contracted program dependence graph PDG satisfies the above-mentioned condition (1) and condition (2), the control flow can be safely restructured. That is, the contracted program dependence graph PDG has invertibility. The processor CPU executing the operation S410 functions as a restructure unit which restructures the control flow in the contracted program dependence graph PDG.

Next, at an operation S420, as for the vertex set which has been made to be contract, the control flow of the vertices which have been made to be contracted is developed by using the control flow among the vertices stored at the time of the processing in FIG. 4. Consequently, a control flow graph CFG at the statement level can be obtained. The processor CPU executing the operation S420 functions as a control flow graph generation unit which generates a contracted control flow graph CFG and generates a control flow graph CFG at the statement level from the contracted control flow graph. At an operation S430, appropriate program language (program codes) is output and an optimized sequential program is obtained. The processor CPU executing the operation 5430 functions as a code generation unit which generates program codes from a control flow graph CFG at the statement level.

Figure 6:
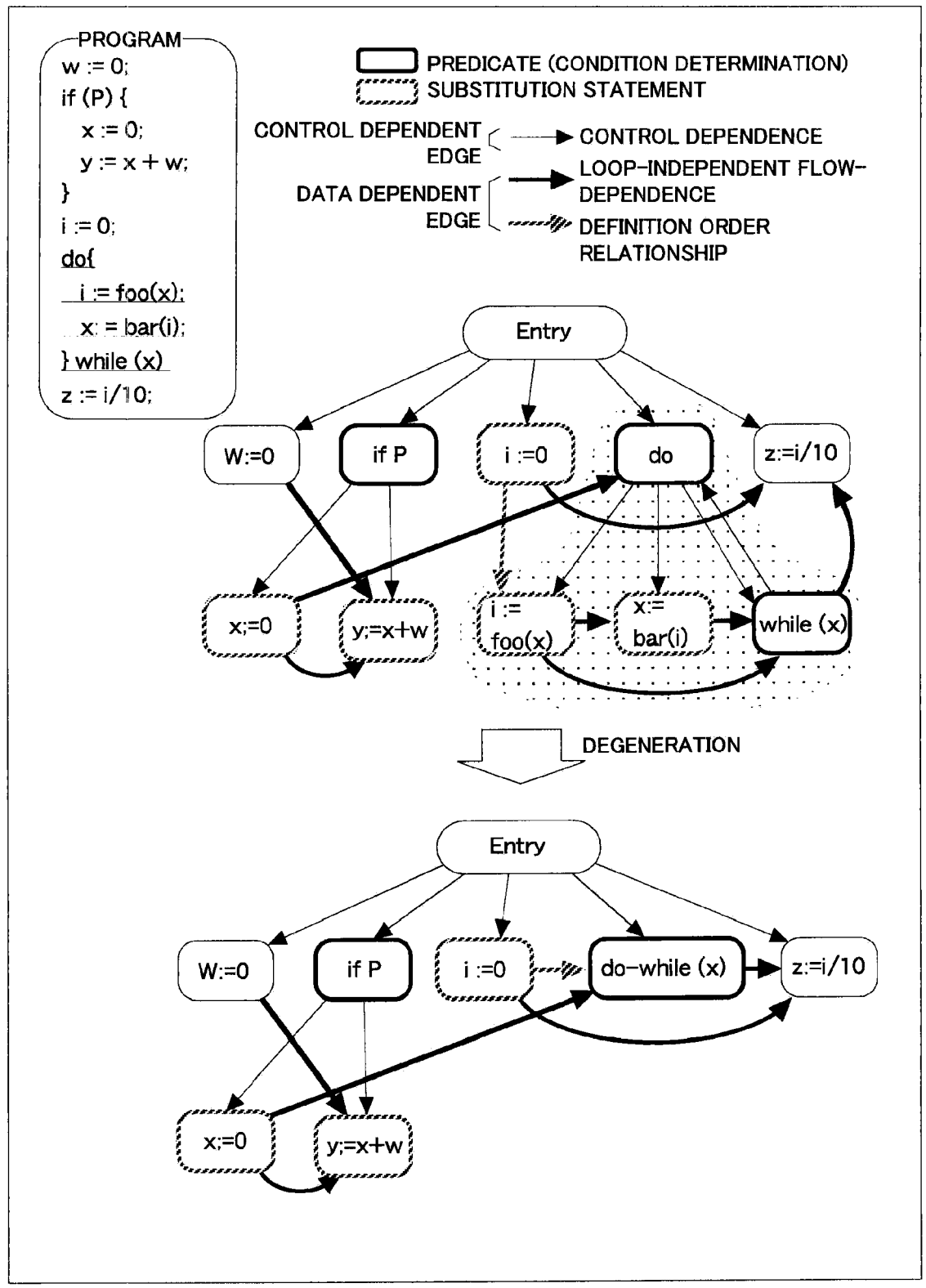
FIG. 6 illustrates an example of the contraction of a program dependence graph in the first embodiment.

FIG. 6 illustrates an example of the contraction of the program dependence graph PDG in the first embodiment. In this example, attention is focused on a control structure of a do-while statement, and the underlined four operations in the program in FIG. 6 are made to be contracted.

In the foregoing first embodiment, in order to reduce the scale (the number of vertices and edges) of the program contracted graph PDG, the dependent elements (dependent relationships) of the program dependence graph PDG are made to be contracted, so that the vertices are merged, and as a result, the program dependence graph PDG with a rough granularity is generated. Consequently, it is possible to make the scale of the contracted program dependence graph PDG far smaller than that of the original program dependence graph PDG. Therefore, a calculation amount (calculation time) necessary for the optimization such as parallel processing of the program can be reduced. That is, the analysis and optimization of large-scale software can be realized in a realistic time.

Executing the contraction while keeping invertibility can ensure invertibility between the contracted program dependence graph PDG and the original program dependence graph PDG. Consequently, a correct program can be output based on the degenerate program dependence graph PDG.

Figure 7:
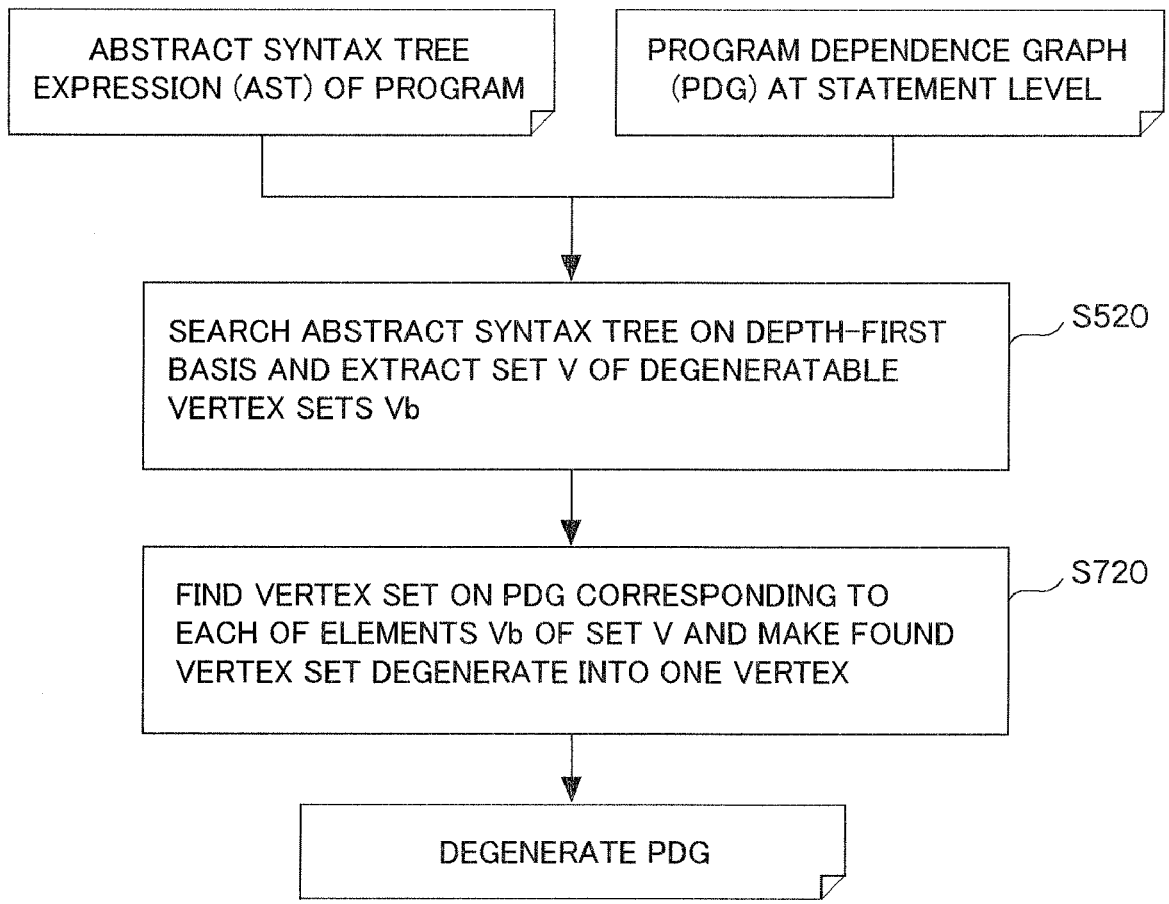
FIG. 7 illustrates a second embodiment.

FIG. 7 illustrates a second embodiment. The same elements as the elements described in the first embodiment will be denoted by the same reference numerals and symbols as those used in the first embodiment, and detailed description thereof will be omitted. In this embodiment, a program dependence graph PDG is made to be contracted based on an abstract syntax tree. Therefore, an abstract syntax tree expression AST of a program and a program dependence graph PDG at the statement level are input. Processing executed by the program analyzing apparatus is the same as that in the first embodiment except the processing at the operation S200 illustrated in FIG. 2. Concretely, instead of the processing illustrated in FIG. 3, processing illustrated in FIG. 7 is executed. An operation S520 is processing corresponding to the operation S500 in FIG. 3. An operation S720 is processing corresponding to the operation S700 in FIG. 3. The processor CPU executing the operation S520 functions as a contraction judgment unit. The processor CPU executing the operation S720 functions as a graph generation unit. The other structure and processing are the same as those in FIG. 1 and FIG. 2.

First, at the operation S520, a syntax tree of the abstract syntax tree expression AST is searched on a depth-first basis, and a set V of vertex sets Vb which are invertibly contractible is extracted. Next, at the operation S720, for each of the elements Vb of the set V, a corresponding vertex set on the program dependence graph PDG is found, and vertices included in each of these sets are made to degenerate into one vertex. That is, a contracted program dependence graph PDG is generated.

The foregoing second embodiment can provide the same effects as those of the above-described first embodiment. In addition, in this embodiment, the use of the abstract syntax tree expression AST of the program makes it possible to generate the program dependence graph PDG whose scale is small and whose invertibility is ensured.

Figure 8:
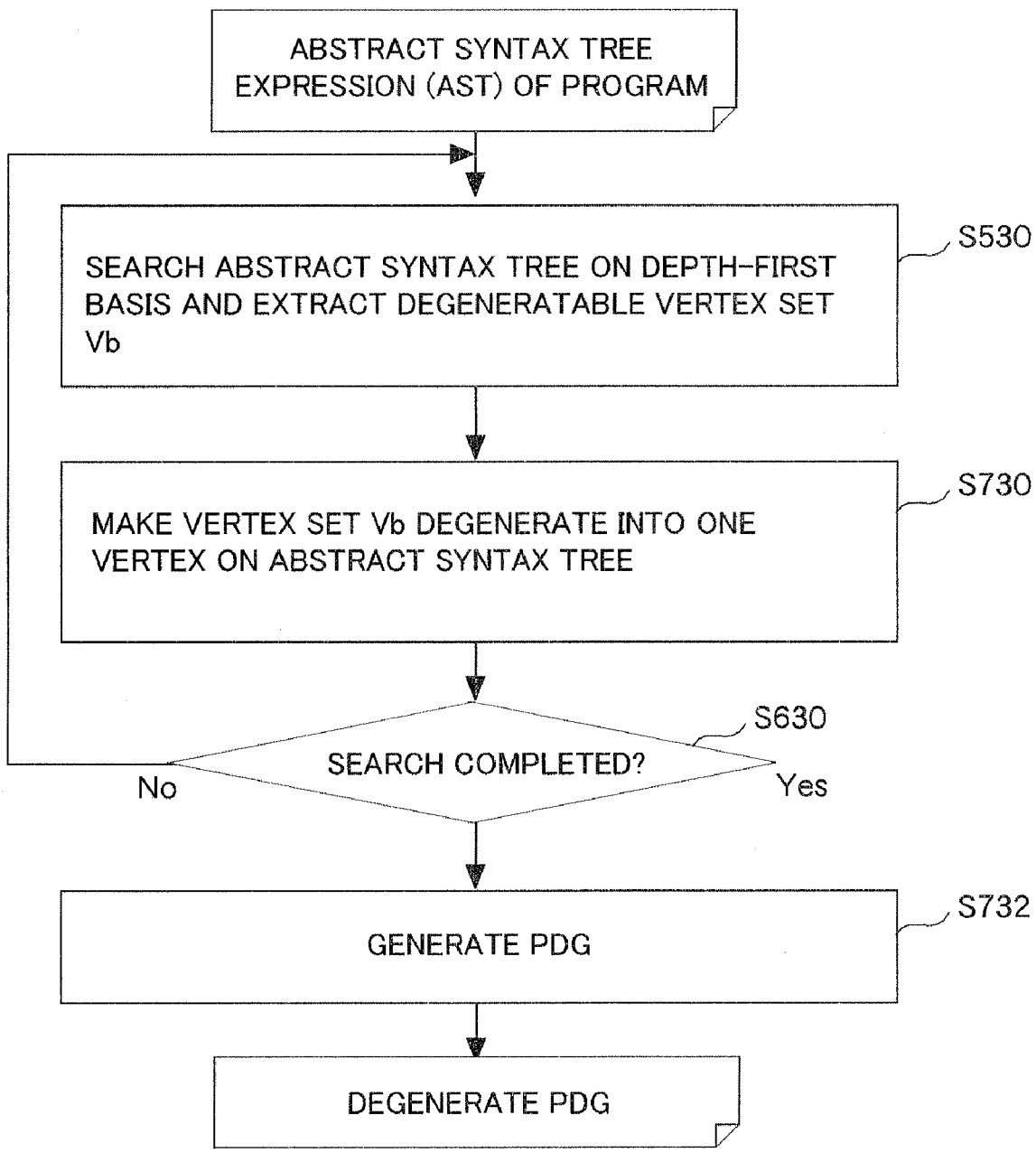
FIG. 8 illustrates a third embodiment.

FIG. 8 illustrates a third embodiment. The same elements as the elements described in the first and second embodiments will be denoted by the same reference numerals and symbols as those used in the first and second embodiments, and detailed description thereof will be omitted. In this embodiment, in order to simplify the search and conversion procedures in the second embodiment (FIG. 7), only an abstract syntax tree expression AST of a program is input. Processing executed by the program analyzing apparatus is the same as that of the first embodiment except the processing at the operation S200 illustrated in FIG. 2. Concretely, instead of the processing illustrated in FIG. 3, processing illustrated in FIG. 8 is executed. An operation S530 is processing corresponding to the operation S500 in FIG. 3. Operations S730, S732 are processing corresponding to the operation S700 in FIG. 3. An operation S630 is processing corresponding to the operation S500A in FIG. 3. The processor CPU executing the operations S530, S630 functions as a contraction judgment unit. The processor CPU executing the operations S730, S732 functions as a graph generation unit. The other structure and processing are the same as those in FIG. 1 and FIG. 2.

First, at the operation S530, a syntax tree of the abstract syntax tree expression AST is searched on a depth-first basis as is done at the operation S520 in FIG. 7, and a vertex set Vb which is invertibly contractible is extracted. Next, at the operation S730, the vertex set Vb is made to be contracted into one vertex on the abstract syntax tree. If it is judged that the search has not been completed at the operation S630, the operations S530, S730 are repeatedly executed. If the search has been completed, a contracted program dependence graph PDG is generated at the operation S732 as is done at the operation S700 illustrated in FIG. 3.

Figure 9:
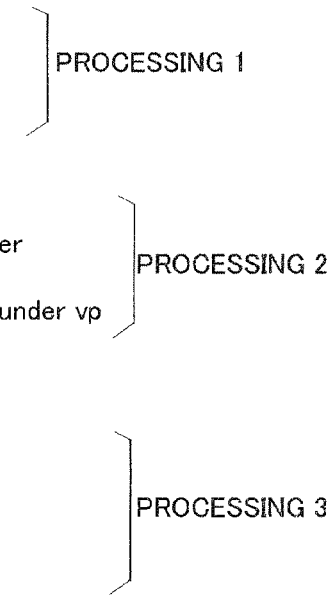
FIG. 9 illustrates the algorithm of an operation S530 in FIG. 8.

FIG. 9 illustrates the algorithm of the operation S530 in FIG. 8. That is, the algorithm for extracting the invertibly contractible vertex set from the abstract syntax tree expression can be represented as illustrated in FIG. 9. As syntaxes in C language not satisfying the above-mentioned condition (1) and condition (2) for restructuring the control flow, there are a switch statement, a do-while statement, break statement, a go to statement, and a return statement except at an end of a function. As for the switch statement and the do-while statement, it is possible to satisfy the condition (1) and the condition (2) by making the whole statement to be contracted into one vertex (processing 1). Regarding a break statement in a for statement or a while statement, it is possible to satisfy the condition (1) and the condition (2) by making the whole of the for statement or while statement, which is its immediate parent, to be contracted into one vertex (processing 2). As for the go to statement and the return statement, since it is difficult to find an appropriate hammock from the syntax tree expression, the hammock is found after the conversion into a control flow graph (processing 3). The contraction of the program dependence graph PDG based on the abstract syntax tree has an advantage of simplifying the search for a contraction range, if a program does not include a go to statement or a return statement except at an end of a function.

The foregoing third embodiment can provide the same effects as those of the above-described first and second embodiments.

Figure 10:
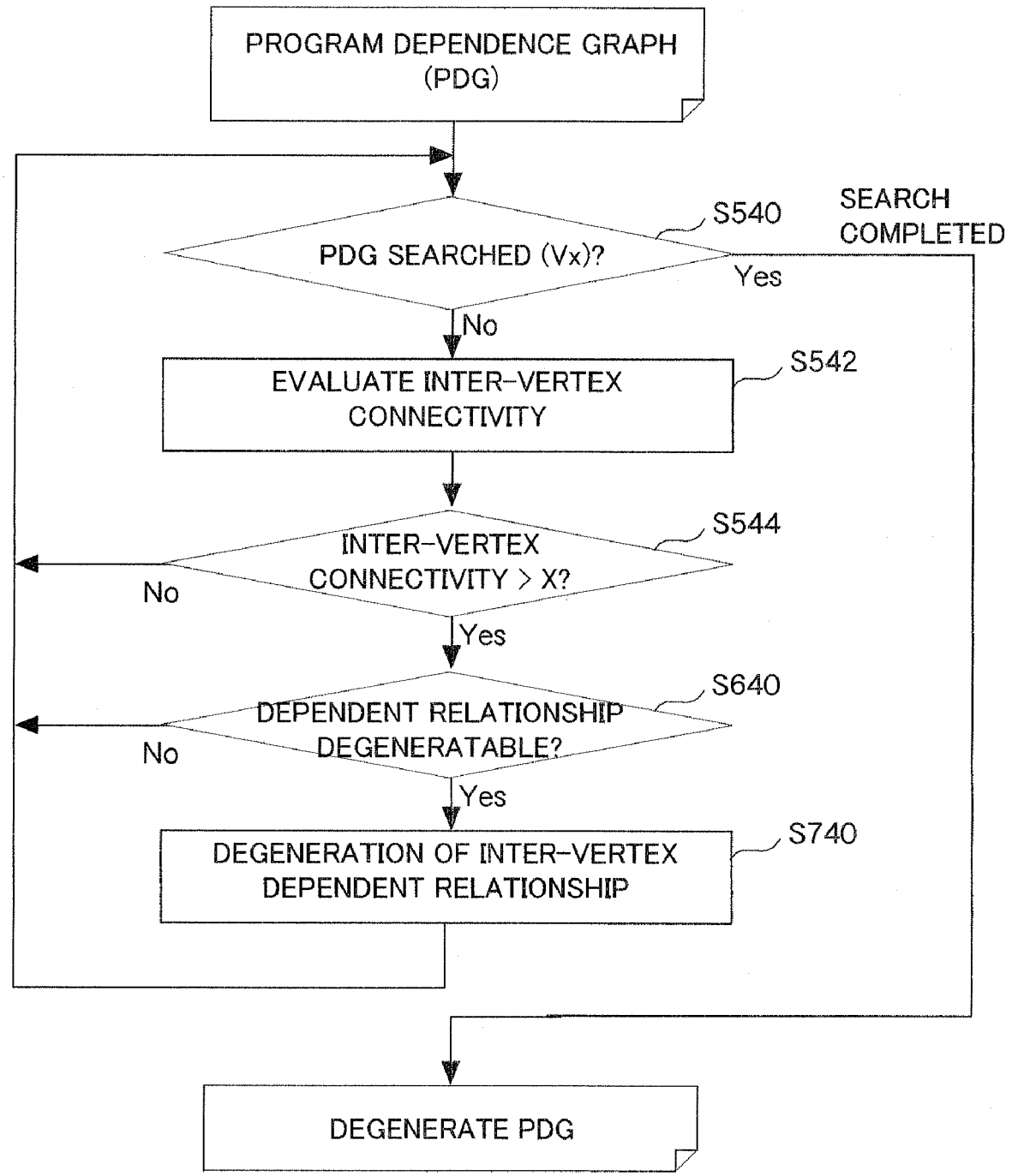
FIG. 10 illustrates a fourth embodiment.

FIG. 10 illustrates a fourth embodiment. The same elements as the elements described in the first embodiment will be denoted by the same reference numerals and symbols as those used in the first embodiment and detailed description thereof will be omitted. This embodiment shows a basic principle for the degeneration of a program dependence graph PDG based on the program dependence graph PDG. Processing executed by the program analyzing apparatus is the same as that of the first embodiment except the processing at the operation S200 illustrated in FIG. 2. Concretely, instead of the processing illustrated in FIG. 3, processing illustrated in FIG. 10 is executed. An operation S540 is processing corresponding to the operation S500A in FIG. 3. Operations S542, S544 are processing corresponding to the operation S500 in FIG. 3. An operation S640 is processing corresponding to the operation S600 in FIG. 3. An operation S740 is processing corresponding to the operation S700 in FIG. 3. The processor CPU executing the operations S540, S542, S544, S640 functions as a contraction judgment unit. The processor CPU executing the operation S740 functions as a graph generation unit. The other structure and processing are the same as those in FIG. 1 and FIG. 2.

First, at the operation S542, based on an input program dependence graph PDC at the statement level, an inter-vertex connectivity in the program dependence graph PDG is found. The connectivity (dependent element) is calculated from a data-dependent edge, its size, a control-dependent edge, and the scale of processing. Next, at the operation S544, it is judged whether or not the inter-vertex connectivity exceeds a given connectivity X which has been set in advance. Next, at the operation S640, it is judged whether or not the dependent relationship of vertices whose connectivity exceeds the above X is contractible. If it is contractible, the dependence relationship is made to be contracted by coupling the vertices, at the operation S740. As a result of executing the processing at the operations S542, S544, S640, S740 for all the inter-vertex connectivities of the program dependence graph PDG, a contracted program dependence graph PDG is generated.

In this embodiment, satisfying the following two conditions (6), (7) is a condition under which the invertible contraction is possible.

(6) On a corresponding control flow graph CFG, branching from the outside of a vertex set to the inside of the vertex set occurs only to a head vertex of the vertex set. On the corresponding control flow graph CFG, branching from the inside of the vertex set to the outside of the vertex set occurs only from a last vertex of the vertex set.

(7) A data dependent path between the vertices does not include any external vertex.

Figure 11:
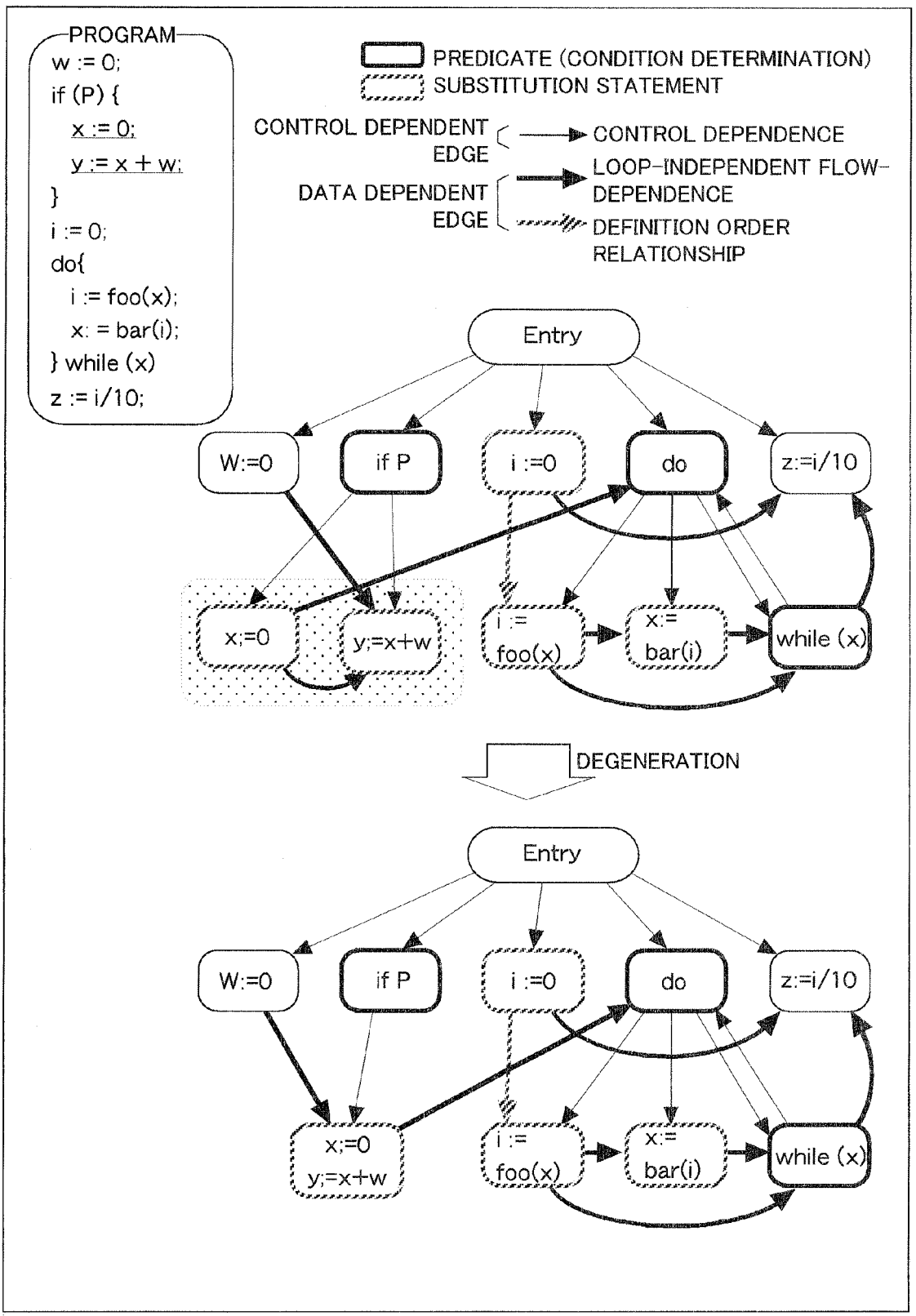
FIG. 11 illustrates an example of the degeneration of a program dependence graph in the fourth embodiment.

FIG. 11 illustrates an example of the contraction of the program dependence graph PDG in the fourth embodiment. In this example, attention is focused on the structure of the program dependence graph PDG, and the underlined two operations in a program in FIG. 11 are made to degenerate.

The foregoing fourth embodiment can provide the same effects as those of the above-described first embodiment. In addition, in this embodiment, the use of only the program dependence graph PDG makes it possible to generate the program dependence graph PDG whose scale is small and whose invertibility is ensured.

Figure 12:
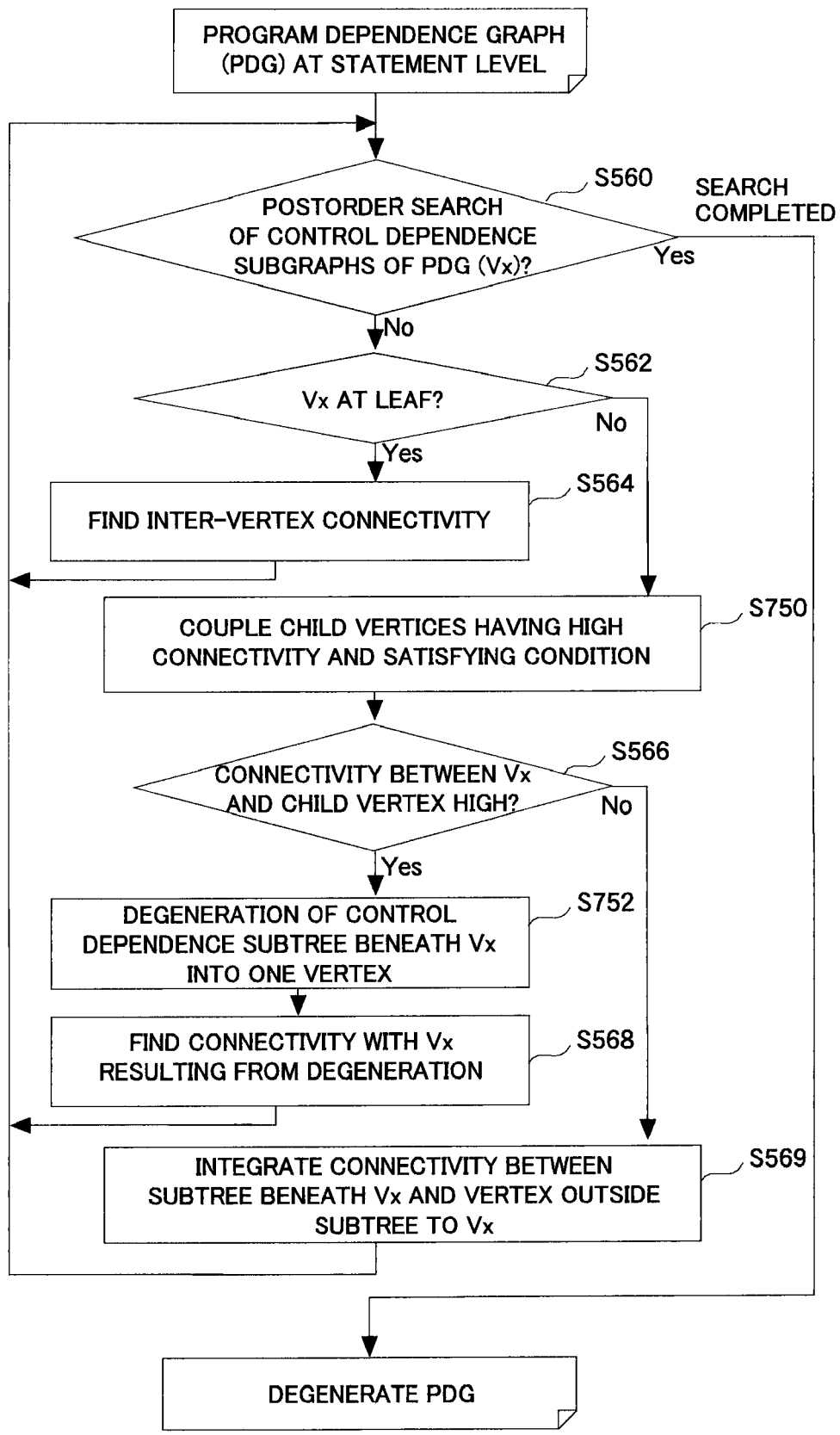
FIG. 12 illustrates a fifth embodiment.

FIG. 12 illustrates a fifth embodiment. The same elements as the elements described in the first and fourth embodiments will be denoted by the same reference numerals and symbols as those used in the first and fourth embodiments and detailed description thereof will be omitted. In this embodiment, the fourth embodiment is more concretely shown, and based on a program dependence graph PDG, the degeneration of this program dependence graph PDG is executed. Processing executed by the program analyzing apparatus is the same as that of the first embodiment except the processing at the operation S200 illustrated in FIG. 2. Concretely, instead of the processing illustrated in FIG. 3, processing illustrated in FIG. 12 is executed. An operation S560 is processing corresponding to the operation S500A in FIG. 3. Operations S562, S564, S568, S569 are processing corresponding to the operation S500 in FIG. 3. An operation S750 is processing corresponding to the operation 5600 and the operation S700 in FIG. 3. An operation S752 is processing corresponding to the operation S700 in FIG. 3. The processor CPU executing the operations S560, S562, S564, S566, S568, S569 functions as a contraction judgment unit. The processor CPU executing the operations S750, 5752 functions as a graph generation unit. The other structure and processing are the same as those in FIG. 1 and FIG. 2.

In FIG. 12, the contraction of the program dependence graph PDG is executed by using a rule that a control dependence subgraph of a program dependence graph PDG satisfying the above-mentioned condition (1) and condition (2) for restructuring the control flow has a tree structure. Further, in order to enable the invertible contraction, the above-mentioned conditions (6), (7) have to be satisfied. The processing illustrated in FIG. 12 is executed, starting with postorder traversal of control dependence subgraphs of the program dependence graph PDG, as illustrated at the operation S560.

First, at the operation S562, it is judged whether or not a vertex Vx is present at a leaf (end of a tree structure). If the vertex Vx is present at a leaf, an inter-vertex connectivity with the vertex Vx at the leaf is found at the operation S564. If the vertex Vx is not present at a leaf, that is, if the vertex Vx is present in the middle of the tree structure, child vertices having a high connectivity and satisfying the condition (7) are coupled and made to be contracted at the operation S750.

Next, at the operation S566, a connectivity between the vertex Vx and the child vertex (parent-child connectivity) is found. If the connectivity is high, a control dependence subtree beneath the vertex Vx is made to be contracted into one vertex at the operation S752. Next, at the operation S568, a connectivity with the vertex Vx resulting from the contracted is found. If the connectivity is low, a connectivity between the subtree beneath the vertex Vx and a vertex outside the subtree is integrated to the vertex Vx at the operation S569. Consequently, a vertex set to be coupled can be found within a range satisfying the above-mentioned condition (6). Then, at an instant when the traversal of all the vertex sets is completed, a program dependence graph PDG is output. The foregoing fifth embodiment can provide the same effects as those of the above-described first and fourth embodiments.

The above embodiments describe the examples where the processor CPU executes the program analyzing program, thereby generating the contracted program dependence graph PDG and generating the sequential program (program codes) which is optimized based on the program dependence graph PDG. However, for example, the contraction judgment unit, the graph generation unit, the restructure unit, the control flow graph generation unit, and the code generation unit which are described above may be realized by hardware.

It is a proposition of the present embodiments to realize the analysis and optimization of large-scale software in a realistic time by generating a contracted program dependence graph having invertibility.

A dependent element group which is invertibly contractible is found, by using program analysis information including a plurality of dependent elements representing dependent relationships of statement and the control being included in a program. Next, consequently a program dependence graph in which dependent elements are made to be contracted is generated by making the found dependent element group contracted. Decreasing the number of vertices and edges of a program dependence graph by the contraction of the dependent elements makes it possible to generate a program dependence graph having a rough granularity. As a result, it is possible to reduce a calculation amount (calculation time) necessary for the optimization processing such as parallel processing of the program. That is, generating the contracted program dependence graph having invertibility makes it possible to realize the analysis and optimization of large-scale software in a realistic time.

For example, a hammock is searched for dependent elements which are not contractible, and by making the searched hammock contracted, the contracted program dependence graph is generated. Alternatively, a contractible vertex set is searched for an abstract syntax tree expression, and by making a vertex set, which is on a program dependence graph and corresponding to the searched vertex set, to be contracted, the contracted program dependence graph is generated. Alternatively, a contractible vertex set in an abstract syntax tree expression is made to be contracted, and the contracted program dependence graph is generated by using a vertex set including the vertex resulting from the contraction. Alternatively, by using a program dependence graph as the program analysis information, vertex sets having a connectivity exceeding a predetermined connectivity are found in the program dependence graph, and a contractible vertex set among the found vertex sets is made to be contracted, and the contracted program dependence graph is generated by using a vertex set including the vertex resulting from the contraction.

For example, a control flow in the contracted program dependence graph is restructured, and a contracted control flow graph is generated. Next, a control flow graph at a statement level is generated from the contracted control flow graph. Then, a program code is generated from the control flow graph at the statement level.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer-assisted method for program analyzing, comprising:
    configuring at least one processor for:
        receiving at least one sequential program including a plurality of elements;
        determining program analysis information for the plurality of elements by at least extracting a data-dependent relationship and a control-dependent relationship;
        determining a group of invertibly contractible elements included in the plurality of elements based on the program analysis information; and
        generating a contracted program dependence graph by contracting the group of invertibly contractible elements; the program analysis information comprises an abstract syntax tree expression and a program dependence graph of the at least one sequential program, the method further comprising:
    searching vertex sets as the dependent elements in the abstract syntax tree expression,
    determining contractible vertex sets; and contracting the determined contractible vertex sets on the program dependence graph program dependence graph into one vertex wherein the contracted program dependence graph is generated at least based on the one vertex.

2. The computer-assisted method according to claim 1, wherein contracting the group of invertibly contractible elements is performed based on the data-dependent relationship and the control-dependent relationship, and
the method further comprising: analysis information;
searching a hammock for non-contractible elements included in the plurality of elements; and
contracting the hammock, wherein the contracted program dependence graph is generated at least based on the contracted hammock.

3. The computer-assisted method according to claim 1, wherein the program analysis information comprises an abstract syntax tree expression of the at least one sequential program, the method further comprising:
searching vertex sets as the dependent elements in the abstract syntax tree expression;
a determining contractible vertex sets; and
making the contractible vertex sets degenerate as one vertex, wherein the contracted program dependence graph is generated by using a vertex set including the vertex resulting from the degeneration.

4. The computer-assisted method according to claim 1, wherein the program analysis information comprises a program dependence graph of the at least one sequential program, the method further comprising:
searching inter-vertex connectivities as the dependent elements in the program dependence graph;
detecting vertex sets having a connectivity incompatible with a predetermined connectivity; and
contracting the detected vertex sets into one vertex, wherein the contracted program dependence graph is generated by using a vertex set including the vertex resulting from the contraction.

5. The computer-assisted method according to claim 1, further comprising:
restructuring a first control flow in connection with the contracted program dependence graph;
generating a contracted control flow graph;
generating a second control flow graph at a statement level based on the contracted control flow graph; and
generating a program code based on the second control flow graph.

6. A program analyzing apparatus, comprising:
a memory for receiving at least one sequential program including a plurality of elements; and
at least one processor coupled with the memory, comprising:
a contraction judgment unit for determining a group of invertibly contractible elements included in the plurality of elements based on program analysis information representing at least a data-dependent relationship and a control-dependent relationship among the plurality of elements; and
a graph generation unit generating a contracted program dependence graph by contracting the group of invertibly contractible elements; the program analysis information comprises an abstract syntax tree expression of the at least one sequential program,
the contraction judgment unit searches vertex sets as the dependent elements in the abstract syntax tree expression, determines contractible vertex sets, and contracts vertex sets which are on the program dependence graph into one vertex; and
the graph generation unit generates the contracted program dependence graph based on the one vertex.

7. The program analyzing apparatus according to claim 6, wherein:
the program analysis information comprises a control flow graph and a program dependence graph of the at least one sequential program,
the contraction judgment unit makes contracts the group of invertibly contractible elements based on the control flow graph and the program dependence graph, searches a hammock which includes non-contractible elements and contracts the hammock, and
the graph generation unit generates the contracted program dependence graph based on the contracted group of invertibly contractible elements and the contracted hammock.

8. The program analyzing apparatus according to claim 6, wherein:
wherein the program analysis information comprises an abstract syntax tree expression of the at least one sequential program,
the contraction judgment unit searches vertex sets as the dependent elements in the abstract syntax tree expression determines and contracts contractible vertex sets into one vertex, and
the graph generation unit generates the contracted program dependence graph based on a vertex set including the one vertex resulting from the contraction.

9. The program analyzing apparatus according to claim 6, wherein:
the program analysis information comprises a program dependence graph of the at least one sequential program,
the contraction judgment unit searches inter-vertex connectivities as the dependent elements in the program dependence graph, detects vertex sets having a connectivity incompatible with a predetermined connectivity, and contracts the detected vertex sets into one vertex, and
the graph generation unit generates the contracted program dependence graph by using a vertex set including the vertex resulting from the contraction.

10. The program analyzing apparatus according to claim 6, further comprising:
a restructure unit restructuring a first control flow in connection with the contracted program dependence graph;
a control flow graph generation unit generating a contracted control flow graph and generating a second control flow graph at a statement level based on the contracted control flow graph; and
a code generation unit generating a program code based on the second control flow graph.

11. A computer readable storage medium storing a program for analyzing a program, the program causing a computer to execute:
receive at least one sequential program including a plurality of elements;
determine program analysis information for the plurality of elements by at least extracting a data-dependent relationship and a control-dependent relationship;
determine a group of invertibly contractible elements included in the plurality of elements based on the program analysis information; and
generate a contracted program dependence graph by contracting the group of invertibly contractible elements; the program analysis information comprises an abstract syntax tree expression and a program dependence graph of the at least one sequential program, vertex sets as the dependent elements in the abstract syntax tree expression are searched by using the abstract syntax tree expression and the program dependence graph, a contractible vertex set, corresponding to the contractible vertex set is located and contracted into one vertex; and the contracted program dependence graph is generated based on the one vertex.

12. The computer readable storage medium storing the program analyzing program according to claim 11, wherein:

the program analysis information comprises a control flow graph and a program dependence graph of the at least one sequential program, contracting the group of invertibly contractible elements is performed based on the control flow graph and the program dependence graph, a hammock is searched for non-contractible dependent elements, and the hammock is contracted, and the contracted program dependence graph is generated based on the contracted group of invertibly contractible elements and the contracted hammock.

13. The computer readable storage medium storing the program analyzing program according to claim 11, wherein:

the program analysis information comprises an abstract syntax tree expression of the at least one sequential program, vertex sets as the dependent elements in the abstract syntax tree expression are searched by using the abstract syntax tree expression contractible vertex sets are located and contracted into one vertex, and the contracted program dependence graph is generated based on a vertex set including the one vertex resulting from the contraction.

14. The computer readable storage medium storing the program analyzing program according to claim 11, wherein:

the program analysis information comprises a program dependence graph of the at least one sequential program, inter-vertex connectivities as the dependent elements in the program dependence graph are searched by using the program dependence graph, vertex sets having a connectivity incompatible with a predetermined connectivity are located and contracted into one vertex, and the contracted program dependence graph is generated by using a vertex set including the vertex resulting from the contraction.

15. The computer readable storage medium storing the program analyzing program according to claim 11, further causing the computer to:

restructure a first control flow in connection with the contracted program dependence graph;

generate a contracted control flow graph and a second control flow graph at a statement level based on the contracted control flow graph; and generate a program code based on the second control flow graph.

\* \* \* \* \*